United States Patent
Frye et al.

(10) Patent No.: US 10,559,947 B2
(45) Date of Patent: Feb. 11, 2020

(54) PROTECTIVE SKIRT FOR TELECOMMUNICATIONS LINES

(71) Applicant: Corning Optical Communications LLC, Hickory, NC (US)

(72) Inventors: Ryan Everette Frye, Newton, NC (US); Chad Lee German, Haslet, TX (US); Trampus Lee Landrum, Hickory, NC (US); Cynthia Cantu Martinez, Fort Worth, TX (US); Fabiola Patricia Villanueva Tavares, Tamaulipas (MX)

(73) Assignee: Corning Optical Communications LLC, Charlotte, NC (US)

( * ) Notice: Subject to any disclaimer, the term of this patent is extended or adjusted under 35 U.S.C. 154(b) by 290 days.

(21) Appl. No.: 15/593,841

(22) Filed: May 12, 2017

(65) Prior Publication Data

US 2017/0346268 A1    Nov. 30, 2017

Related U.S. Application Data

(60) Provisional application No. 62/342,329, filed on May 27, 2016.

(51) Int. Cl.
*H05K 7/02* (2006.01)
*H05K 7/04* (2006.01)
*H02G 3/04* (2006.01)

(52) U.S. Cl.
CPC ................. *H02G 3/0431* (2013.01)

(58) Field of Classification Search
USPC ........................................................ 361/810
See application file for complete search history.

(56) References Cited

U.S. PATENT DOCUMENTS

| 6,223,909 | B1 * | 5/2001 | Mendoza | ............... | H04Q 1/116 |
| | | | | | 211/26 |
| 6,273,752 | B1 * | 8/2001 | Martin | ................. | G02B 6/3897 |
| | | | | | 439/540.1 |
| 7,499,621 | B2 | 3/2009 | Vanhentenrijk et al. | | |
| 8,805,140 | B2 | 8/2014 | Le Dissez | | |

\* cited by examiner

*Primary Examiner* — Hung S. Bui
(74) *Attorney, Agent, or Firm* — Grant A. Gildehaus (57) ABSTRACT

A protective apparatus for telecommunication lines includes a mounting frame, a transition platform coupled to the mounting frame, and a protective skirt that is coupleable to the mounting frame. The mounting frame includes at least one sidewall having a sidewall opening to allow passage of a telecommunication line. The transition platform includes an opening to allow passage of the telecommunication line to an adjacent telecommunications terminal. The protective skirt includes a cutout corresponding in shape to the sidewall. The mounting frame, the transition platform and the protective skirt define an internal space when the protective skirt is coupled to the mounting frame. The telecommunications lines enter and exit the internal space by passing through the openings in the sidewalls, thus permitting removal of the protective skirt without the need to remove some or all of the telecommunications lines from the mounting frame or the telecommunications terminal.

12 Claims, 9 Drawing Sheets

PROTECTIVE SKIRT FOR TELECOMMUNICATIONS LINES

CROSS-REFERENCE TO RELATED APPLICATIONS

This application claims the benefit of priority of U.S. Provisional Application Ser. No. 62/342,329, filed on May 27, 2016, the content of which is relied upon and incorporated herein by reference in its entirety.

BACKGROUND

Field

The present invention relates generally to protective elements for telecommunications lines, and more particularly to a protective skirt and related hardware for protecting telecommunications lines as they enter or exit a telecommunications terminal.

Technical Background

Telecommunications terminals in a telecommunications network may be referred to as local convergence points (LCP), fiber distribution terminals (FDT), fiber distribution hubs (FDH), and the like. Such telecommunications terminals are typically cabinets or enclosures which house fiber or electrical junctions, such as, for example, fiber connection points, splices, splitters, optical-to-electrical converters or other components. The telecommunications terminal provides a convergence point that offers management capabilities to the network operator or service provider.

Telecommunications cables often transfer data from a central office to dispersed homes, apartments, office buildings, or other locations via telecommunications terminal. The cables are often routed through underground conduits or aboveground on elevated telephone poles. At the point where the cable approaches a home, apartment, office building or other location for final deployment, there is often a need to expose the cable from the underground conduit or elevated telephone pole to connect the cable to a telecommunications enclosure for splicing, optical\electrical conversion, splitting, or other coupling to local feeder cables or drop cables. The cable is protected in the underground conduit or above-ground telephone pole and when the cable is within the enclosure, but the cable may be unprotected directly outside of the enclosure. It would be beneficial to have a protective covering for the portion of a cable directly outside of an enclosure as the cable enters or exits the enclosure. It would also be beneficial if the protective covering were easily accessible and modifiable for moves, adds, and changes to the enclosure and/or cables.

SUMMARY OF THE DETAILED DESCRIPTION

Embodiments disclosed herein include a protective apparatus for telecommunication lines. The protective apparatus may include a mounting frame defining an internal space, a transition platform coupled to the mounting frame and a protective skirt that is attachable to the mounting frame. The mounting frame includes a sidewall having a sidewall opening to allow passage of a telecommunication line into the internal space from an exterior space outside of the mounting frame. Likewise, the transition platform comprises an opening to allow passage of the telecommunication line from the interior space to a telecommunications terminal positioned adjacent to the transition platform. The protective skirt includes a cutout corresponding in shape to the sidewall. As such, the telecommunications lines may pass through the sidewalls of the mounting frame and need not pass through the protective skirt. As such, the telecommunications may remain attached to the sidewalls and the telecommunications terminal while the protective cover is removed. This reduces the time required for moves, adds or changes to the telecommunications lines and/or the telecommunications terminal.

Also described herein is a method of protecting telecommunications lines. The method includes securing a mounting frame to an external wall or facade of a building, home or other structure. The mounting frame defines an internal space. The mounting frame also includes at least one sidewall having a removable portion to allow passage of a telecommunication line into the internal space defined by the mounting frame from an exterior space outside of the mounting frame. The method also includes passing the telecommunications line through an opening in a transition platform and to a telecommunications terminal positioned adjacent to the transition platform. The transition platform is coupled to the mounting frame. In some instances, the transition platform is pivotally coupled to the mounting frame on a hinge using a pull-pin hinge. The method also includes securing a protective skirt to the mounting frame such that a cutout of the protective skirt is aligned with the removable portion. As such, the removable portion of the sidewalls is accessible while the protective skirt is attached to the mounting frame. Also, the protective skirt is removable without the need to disengage the telecommunications lines, which reduces the time and skill required to remove the protective skirt and/or replace or repair some of the telecommunications lines.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include a protective apparatus for telecommunication lines that enter or exit a telecommunications terminal. A telecommunications terminal may also be referred to as a local convergence point (LCP), a fiber distribution hub (FDH), a fiber distribution terminal (FDT), or the like. The telecommunications terminal may include a shell or other enclosure that defines an interior space and at least one cable entry port. The cable entry port may be configured to receive at least one feeder cable and at least one distribution cable. To protect the portions of the feeder cable and the distribution cable that are external to the telecommunications terminal, the protective apparatus includes a mounting frame, a transition platform and a protective skirt that encloses the exposed portions of the feeder and distribution cables.

The mounting frame is configured to be fixed to an exterior facade or surface of a home, building, or other structure. The transition platform accommodates passage of the distribution cable from the telecommunications terminal into the internal space defined by the mounting frame. The mounting frame also includes at least one sidewall having a sidewall opening to allow passage of feeder or distribution cables into or out of the internal space. The protective skirt is removably attachable to the mounting frame to protect the portions of the feeder cable and distribution cable within the internal space of the protective apparatus. The side walls mate with the cutouts to protect the feeder and distribution cables while allowing for removal of the protective skirt without the need to remove or disengage the feeder or distribution cables. As such, the protective apparatus provides for a more rapid deployment of feeder and distribution cables through the use of sidewalls on the mounting frame. The positioning of the sidewalls on the mounting frame facilitates removal of the protective skirt without the need to remove or disconnect the feeder cables, thus reducing the time required to remove the protective skirt. In addition, the transition platform provides for a convenient interface between the internal space of the mounting frame and the telecommunications terminal, thus reducing the complexity of the interface and the number of parts required to protect the feeder and distribution cables.

Figure 1:
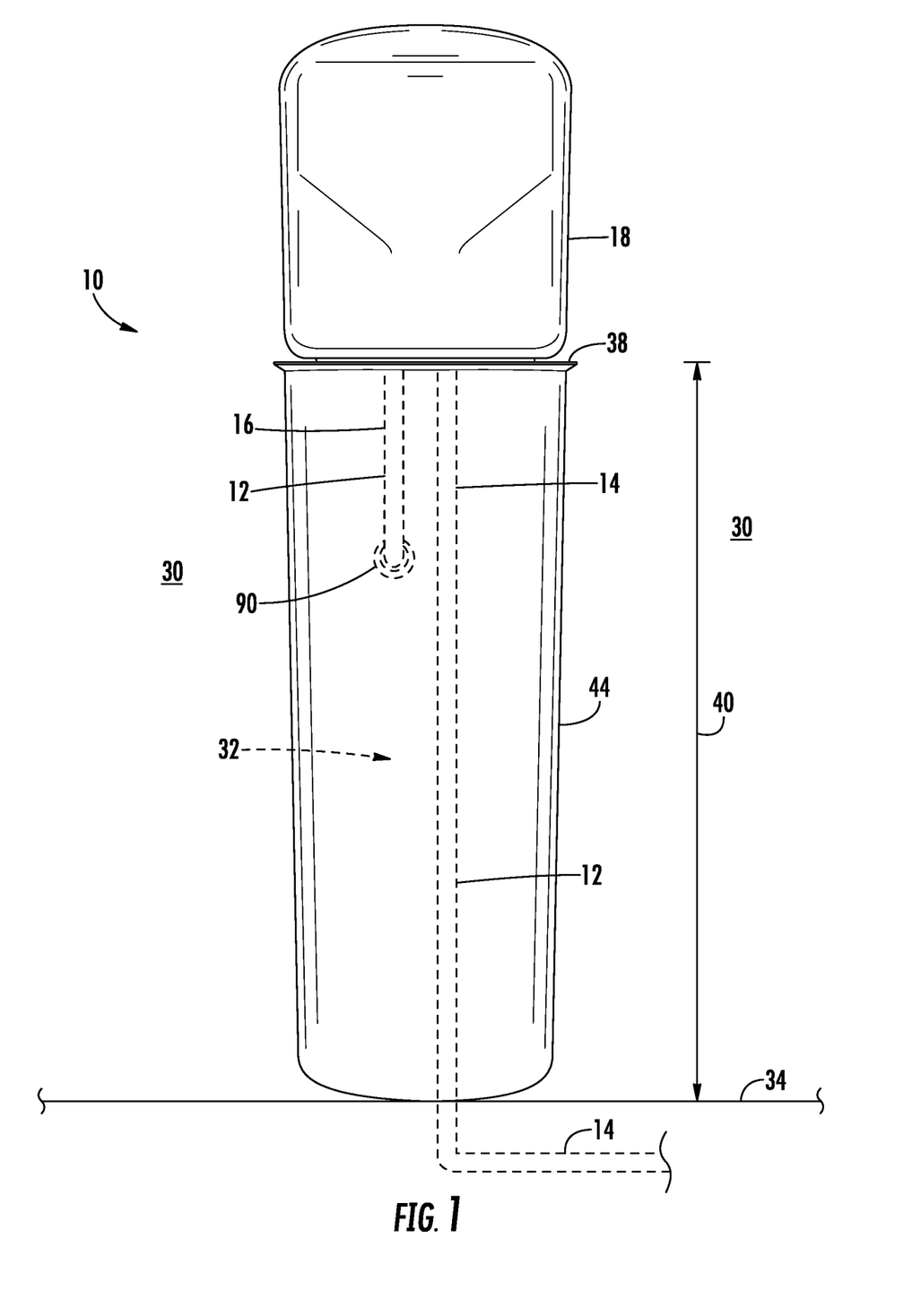
FIG. 1 is a front, perspective view of an exemplary embodiment of a protective apparatus for telecommunication lines positioned below an example telecommunications terminal.

In this regard, FIG. 1 illustrates a protective apparatus 10 for telecommunication lines 12 according to one embodiment of the disclosure. The protective apparatus 10 provides protection for and convenient access to feeder cables 14 and distribution cables 16 of a telecommunications terminal 18. The protective apparatus 10 protects the feeder and distribution cables 14, 16 from accidental or intentional damage.

The protective apparatus 10 includes a mounting frame 20 (see FIG. 3) that is securable to an exterior surface or facade 30 of the building, home or other structure; a transition platform 38 coupled to the mounting frame 20 to provide a convenient transition from the internal space 32 defined by the mounting frame 20, the transition platform 38 and the protective skirt 44 to the telecommunications terminal 18; and a protective skirt 44 that is removably coupleable to the mounting frame 20. The protective apparatus 10 is positionable adjacent to a telecommunications terminal 18 to protect the exposed portions of the feeder and distribution cables 14, 16 that enter and exit the telecommunications terminal.

Figure 2:
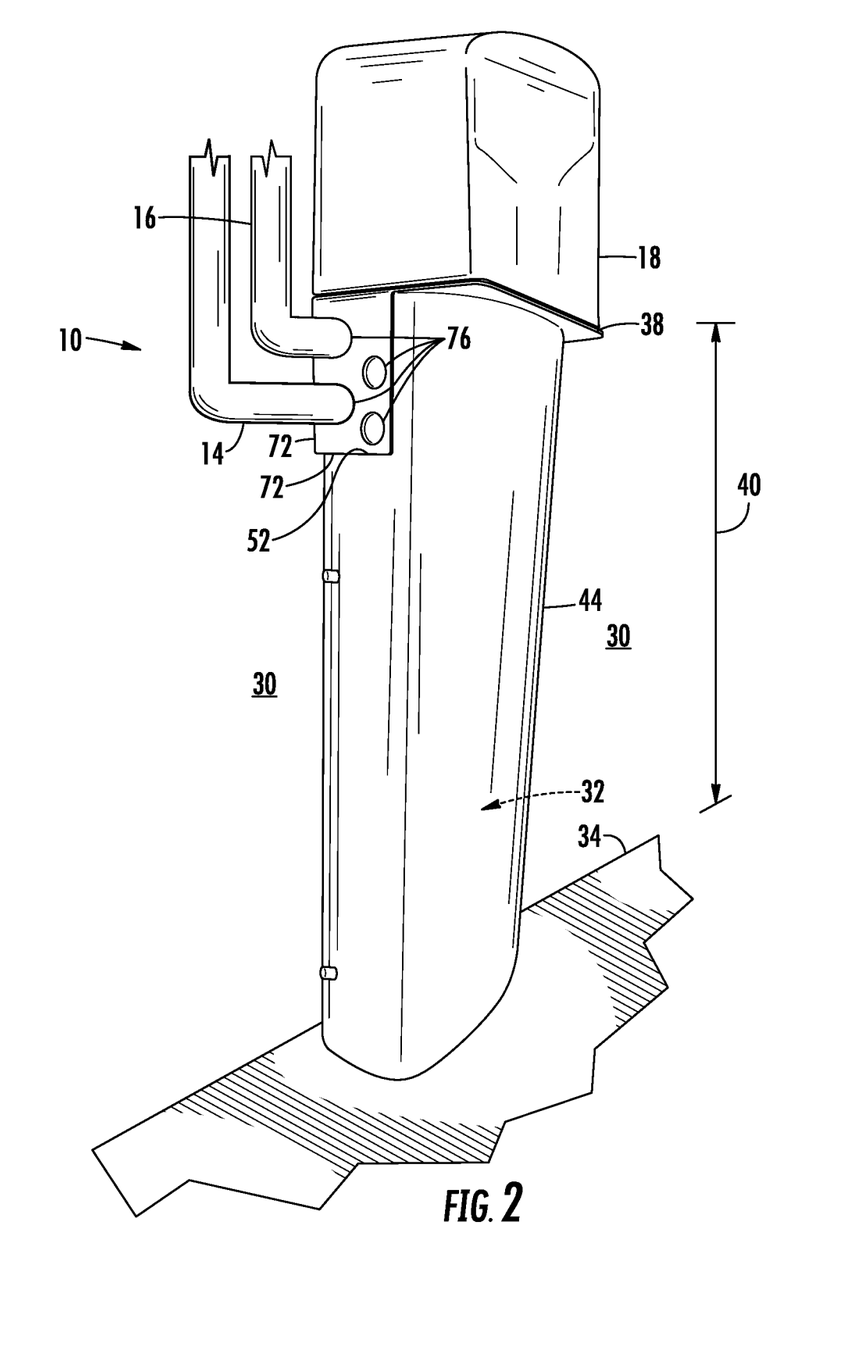
FIG. 2 is a side, perspective view of the protective apparatus of FIG. 1.

Referring now to FIGS. 1 and 2, the protective apparatus 10 may be positioned between a telecommunications terminal 18 and a ground surface 34. For example, the telecommunications terminal 18 may be installed in an aerial installation on a building facade 30 with the protective apparatus 10 installed on the building facade 30 below the telecommunications terminal 18. The protective apparatus 10 may be positioned between a ground surface 34 and the telecommunications terminal 18 to substantially protect the area between the ground surface 34 and the telecommunications terminal 18 and the telecommunication cables 16 contained therein.

In various types of telecommunications installations, the feeder and distribution cables 14, 16 may be aerial cables, subterranean cables, the cables may be secured to the exterior facade 30 of the building, or a combination of the foregoing. As such, the protective apparatus 10 accommodates various cable positions. For example, the feeder cables 14 in FIG. 1 are subterranean cables that extend from the ground surface 34 vertically into the telecommunications terminal 18. The subterranean cables 14 are protected when underground and the protective skirt 44 protects these cables 14 from damage as the cables extend from the ground surface 34 to the telecommunications terminal 18.

In the embodiment illustrated in FIG. 2, the feeder cables 14 are aerial cables that are secured to the facade 30 of the building before entering the telecommunications terminal 18. The sidewalls 72, 74 (sidewall 74 is shown in FIG. 3) allow for the feeder cables 14 to enter the internal space 32 defined by the mounting frame 20 and the protective skirt 44 through openings 76 in the sidewalls 72, 74, as described in more detail below.

Likewise, the distribution cables 16 may exit the telecommunications terminal through the transition platform and enter the building through other openings 90 in the building facade 30 (see FIG. 1) that are protected by the protective skirt 44 or by traveling along the building facade 30 (see FIG. 2) before entering the building. The protective skirt 44 protects at least a portion of the distribution cables 16 as the cables 16 exit the telecommunications terminal 18.

Referring still to FIGS. 1 and 2, the height of the mounting frame 20 and the protective skirt 44 may be sized to correspond to the distance 40 between the telecommunications terminal 18 and the ground surface 34. In addition, the width of the mounting frame 20 and the protective skirt 44 may be sized to correspond to the width of the telecommunications terminal 18.

Figure 3:
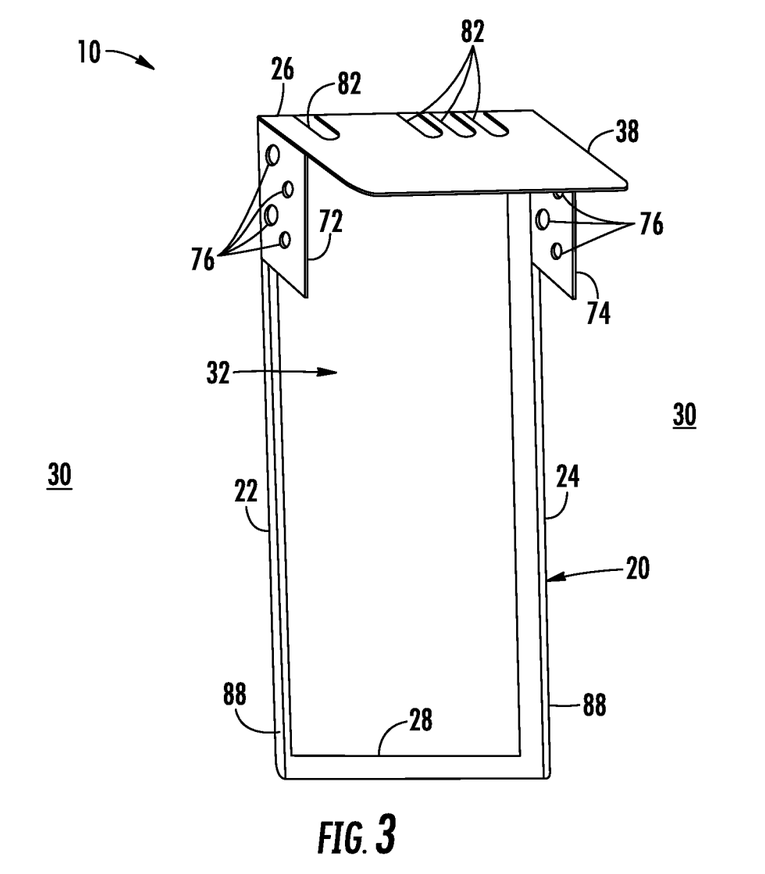
FIG. 3 is a side, perspective view of an exemplary embodiment of a protective apparatus for telecommunication lines with the protective skirt removed.

FIG. 3 illustrates an embodiment of a protective apparatus 10 with the protective skirt 44 removed for clarity. The mounting frame 20 may include a first vertical member 22, a second vertical member 24, a first transverse member 26, and a second transverse member 28. The first vertical member 22, the second vertical member 24, the first transverse member 26, and the second transverse member 28 may be arranged in a rectangular formation thereby defining an internal space 32 between the first vertical member 22, the second vertical member 24, the first transverse member 26, and the second transverse member 28.

The first vertical member 22 and the second vertical member 24 may each include a flange 88 that extends away from an external wall 30 to which the mounting frame 20 is mountable. The flange 88 may include openings or other attachment mechanisms (not shown) to facilitate coupling of the protective skirt 44 (FIG. 4) to the mounting frame 20, as described in more detail below.

The first vertical member 22, the second vertical member 24, the first transverse member 26, and the second transverse member 28 are coupleable to an external facade or wall 30 of a building, house, or other structure. For example, in some embodiments The first vertical member 22, the second vertical member 24, the first transverse member 26, and the second transverse member 28 are coupled to an external surface 30 of the building by way of screws that pass through openings (not illustrated) in any or all of the first vertical member 22, the second vertical member 24, the first transverse member 26, and the second transverse member 28. Other attachment mechanisms for securing the mounting frame 20 to an external surface or facade 30 of a building are known by those skilled in the art and are within the scope of this disclosure.

Although not illustrated, the mounting frame 20 may include additional members to provide additional structural strength to the protective apparatus 10. For example, the mounting frame 20 may include additional transverse members between the first vertical member 22 and the second vertical member 24 to provide added structural strength to the mounting frame 20.

In addition, the first vertical member 22, the second vertical member 24, the first transverse member 26, and the second transverse member 28 may each include weatherproofing features to seal the protective skirt 44 (FIG. 4) to the mounting frame 20. For example, one or more of the first vertical member 22, the second vertical member 24, the first transverse member 26, and the second transverse member 28 may include one or more grommets to seal the first vertical member 22, the second vertical member 24, the first transverse member 26, and the second transverse member 28 to the protective skirt 44 when the protective skirt 44 is attached to the mounting frame 20.

Although the mounting frame 20 is illustrated in a rectangular format in the figures associated herewith, the mounting frame 20 and protective skirt (FIG. 4) may have any suitable size and shape.

FIG. 3 also illustrates the first and second sidewalls 72, 74 of the mounting frame 20. The first side wall 72 is positioned opposite from the second sidewall 74 in the embodiment shown in FIG. 3, but the sidewalls 72, 74 may be positioned in any suitable location on the mounting frame 20. In addition, the mounting frame 20 may include any number of sidewalls 72, 74 that protrudes from the mounting frame 20.

The sidewalls 72, 74 may be any suitable size and shape. In the embodiment illustrated in FIG. 2, for example, the sidewalls 72, 74 are rectangular in shape and extend perpendicularly from the first and second vertical members 22, 24 of the mounting frame 20. While only two sidewalls 72, 74 are illustrated in FIG. 3, the mounting frame 20 may include any number of sidewalls 72, 74.

The sidewalls 72, 74 may be positioned at any suitable location on the first and second vertical members 22, 24. In the embodiment illustrated in FIG. 2, the sidewalls 72, 74 are positioned near the transition platform 38. In other embodiments, the sidewalls 72, 74 are positioned at other locations to accommodate the positioning of the feeder or distribution cables 14, 16 (FIGS. 1 and 2). In addition, the sidewalls 72, 74 illustrated in FIG. 2 extend along only a small portion of the first and second vertical members 20, 22. However, the sidewalls 72, 74 may be any suitable size and may extend along a shorter or longer portion of the first and second vertical members 22, 24. For example, in some embodiments the sidewalls 72, 74 extend along the entire distance of the first and second vertical members 22, 24 to provide sidewall openings 76 along the entire distance of the first and second vertical members 22, 24.

Each sidewall 72, 74 includes at least one sidewall opening 76 to allow passage of a telecommunication line 12 (FIGS. 1 and 2) into or from the internal space 32 defined by the mounting frame 20, the transition platform 38 and the protective skirt 44. The sidewall openings 76 may be any suitable size and shape. In some embodiments, the sidewall openings 76 include removable portions (not shown) that seal the sidewall openings 76 when the sidewall openings 76 are not in use. The removable portions are removable when a craftsman desires to use a particular sidewall opening 76. For example, the removable portions may be fixed to the sidewall openings 76 by a weakened peripheral edge that is configured to break away from the sidewall opening 76 when a force is applied to the removable portion.

The sidewalls 72, 74 provide several benefits. As discussed above, in some embodiments the feeder or distribution cables 14, 16 may extend to or from locations other than the ground surface 34 immediately below the telecommunications terminal 18 (FIGS. 1 and 2). As such, the feeder or distribution cables 14, 16 may not be able to pass directly from the ground surface 34 into the internal space 32. The sidewalls 72, 74 provide a convenient location for telecommunications cables 12 to into or out of the interior space 32. Also, as best illustrated in FIGS. 2 and 3, the sidewalls 72, 74 may extend perpendicularly from the exterior wall 30 of the building to provide easy access for a craftsman to insert feeder or distribution cables 14, 16 through the sidewall openings 76 of the sidewalls 72, 74. The sidewalls 72, 74 remain fixed to the mounting frame 20 when the protective skirt 44 (FIG. 4) is removed, thus allowing a craftsman to remove the protective skirt 44 without the need to modify or remove telecommunications cables 14, 16.

Figure 4:
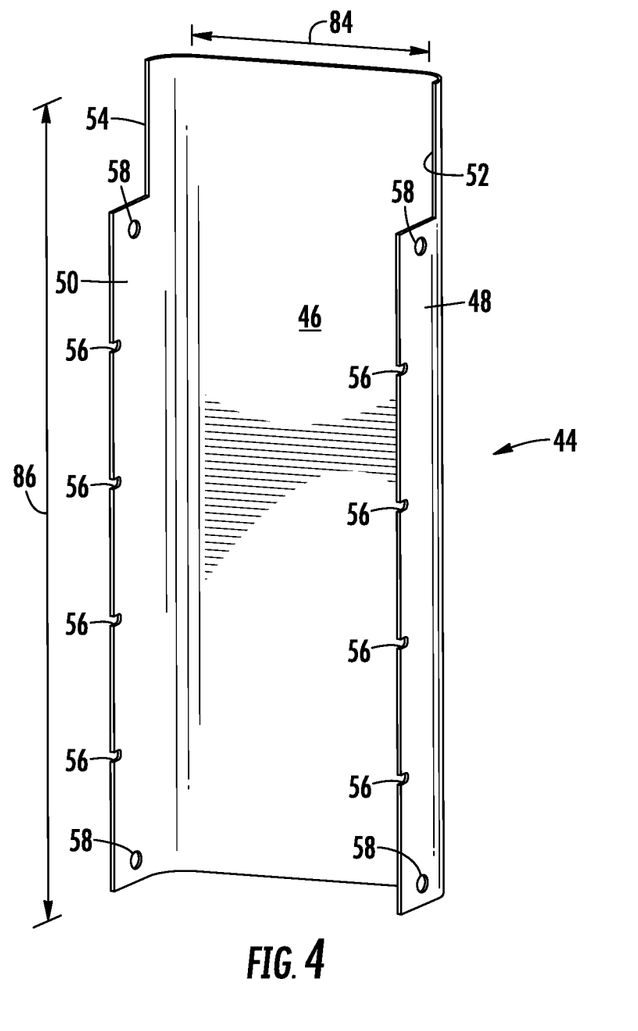
FIG. 4 is a rear, perspective view of an exemplary embodiment of a protective skirt.

FIG. 4 illustrates a back, perspective view of an example embodiment of a protective skirt 44. The protective skirt 44 includes a main body portion 46 and two side body portions 48, 50 that together define a U-shaped cross-section. The main body portion 46 may be planar or maybe curved depending on the area to the enclosed by the protective skirt 44 and the aesthetic requirements of the protective skirt 44. Likewise, the two side body portions 50 may be planar or curved.

As discussed above, the overall height of the protective skirt 44 may correspond to the distance 40 (FIGS. 1 and 2) between the telecommunications terminal 18 and the ground surface 34. Likewise, the height 86 of the main body portion 46 of the protective skirt 44 may correspond to the distance 40 (FIGS. 1 and 2) between the telecommunications terminal 18 and the ground surface 34. Similarly, the width 84 of the main body portion 44 may correspond to the width of the telecommunications terminal 18 (FIGS. 1 and 2).

While the protective skirt 44 has a U-shaped cross section and a generally rectangular shape in FIG. 4, the protective skirt 44 may have any suitable shape and size. For example, in some embodiments the protective skirt 44 may flare outwardly at one or more locations to protect specific portions of a telecommunications line 12 or to accommodate particular surfaces in a building facade 30.

The protective skirt 44 includes a first side portion 48 and a second side portion 50 that extend away from the main body portion 46. The first and second side portions 48, 50 include fastening features for removably coupling the protective skirt 44 to the mounting frame 20. For example, in the embodiment illustrated in FIG. 4 the first and second side portions 48, 50 include slots 56 and openings 58 for securing the protective skirt 44 to the mounting frame 20.

The intersection between the main body portion 46 and the side portions 48, 50 may include a fillet, bend, chamfer, or other feature to improve the structural strength of the protective skirt 44 and to accommodate aesthetic requirements of the protective skirt 44.

The first and second side portions 48, 50 of the protective skirt 44 include first and second cutouts 52, 54, respectively. The cutouts 52, 54 allow access to the sidewall openings 76 of the sidewalls 72, 74 when the protective skirt 44 is mounted to the mounting frame 20, as best illustrated in FIG. 2. Thus, the number, size and position of the cutouts 52, 54 corresponds the number, size and position of the sidewalls 72, 74 and sidewall openings 76 of the mounting frame 20. When the protective cover 44 is mounted to the mounting frame 20, the cutouts 52, 54 are aligned with the sidewall openings 76 so that the telecommunications lines 14, 16 that are positioned in the sidewall openings 76 pass through the cutouts 52, 54, as best illustrated in FIG. 2.

The first and second cutouts 52, 54 may have a non-enclosed shape that corresponds in size and shape to the first and second sidewalls 72, 74 of the mounting frame 20. Thus, a peripheral edge of each side wall 72, 74 may correspond to an inner edge of each cutout 52, 54. As such, the peripheral edge of the side wall 72, 74 is positioned adjacent to the inner edge of the cutout 52, 54 when the protective skirt 44 is removably coupled to the mounting frame 20. The proximate positioning of the peripheral edge of the sidewalls 72, 74 and the inner edge of the cutouts 52, 54 provides for the protection of the internal area 32 and the portions of the telecommunications cables 14, 16 contained therein. In other words, while there may be a small gap between the peripheral edge of the sidewalls 72, 74 and the inner edge of the cutouts 52, 54, the gap may be small enough to provide for at least some protection to the internal space 32, for example, to prevent a person from accessing the telecommunications lines 14, 16 through the gap. In other embodiments, either or both of the inner edge of the cutouts 52, 54 or the peripheral edge of the sidewall 72, 74 may include a sealing feature to prevent entry of contaminants, such as water, dust or dirt, into the internal space 32.

The first and second cutouts 52, 54 may have a non-enclosed shape with an open end. The non-enclosed shape allows the protective skirt 44 to be removed from the mounting frame 20 without the need to remove or reposition the telecommunications cables 14, 16 that pass through the sidewall openings 76. Referring again to FIG. 2, for example, it can be seen that the protective skirt 44 is removable without removing any of the telecommunications cables 14, 16 from the sidewall 72. This greatly reduces the time needed for moves, adds or changes to the telecommunications enclosure 18 or the telecommunications cables 14, 16.

In addition, the positioning of the sidewalls 72, 74 on the mounting frame 20, which is secured to an exterior wall 30 of the building, house, or other structure, rather than on the protective skirt 44 provides a benefit because the protective skirt 44 can be removed from the mounting frame 20 without the need to remove the feeder or distribution cables 14, 16 from the sidewalls 72, 74. Thus, the protective skirt 44 can be removed from the protective apparatus 10 to adjust or repair one or more of the feeder or distribution cables 14, 16 without modifying or removing any of the other feeder or distribution cables 14, 16. Likewise, the protective skirt 44 is removable from the mounting frame 20 without adjusting the position of the sidewalls 72, 74 or telecommunication cables 14, 16, which reduces the time required to remove the protective skirt 44 or service the telecommunications terminal 18 or particular telecommunications cables 12, 14.

Referring again to FIG. 3, the mounting frame 20 of the protective apparatus 10 also includes a transition platform 38. The transition platform 38 may form an integral part of the mounting frame 20 or may be separately attachable to the mounting frame 20.

The transition platform 38 may be substantially planar and may have a width that corresponds to the width of the mounting frame 20. The depth of the transition platform 38 may correspond to the depth of the telecommunications terminal 18. In some embodiments, for example, the transition platform 38 is positionable directly below the telecommunications terminal and the depth of the transition platform 38 corresponds to the overall depth of a bottom portion of the telecommunications terminal 38.

The transition platform 38 includes at least one opening 82 to allow passage of telecommunication lines 12, 14 from the interior space 32 to the telecommunications terminal 18. In the embodiment illustrated in FIG. 3, the openings 82 in the transition platform are a non-enclosed shapes having an open end. The open end is positionable such that it faces the external wall 30 of the building, house or other structure when the mounting frame 20 is secured to the external wall 30 of the building, house or other structure. As such, the telecommunication lines 12, 14 that pass through the opening 82 are trapped between the openings 82 and the external wall 30. This provides a benefit in that the feeder and distribution cables 12, 14 need not be fed through an enclosed opening but rather can be positioned between the transition platform 38 and the exterior wall 30 of the building and then simply trapped within the opening 82 by moving the transition platform against the exterior wall 30 of the building.

Figure 5:
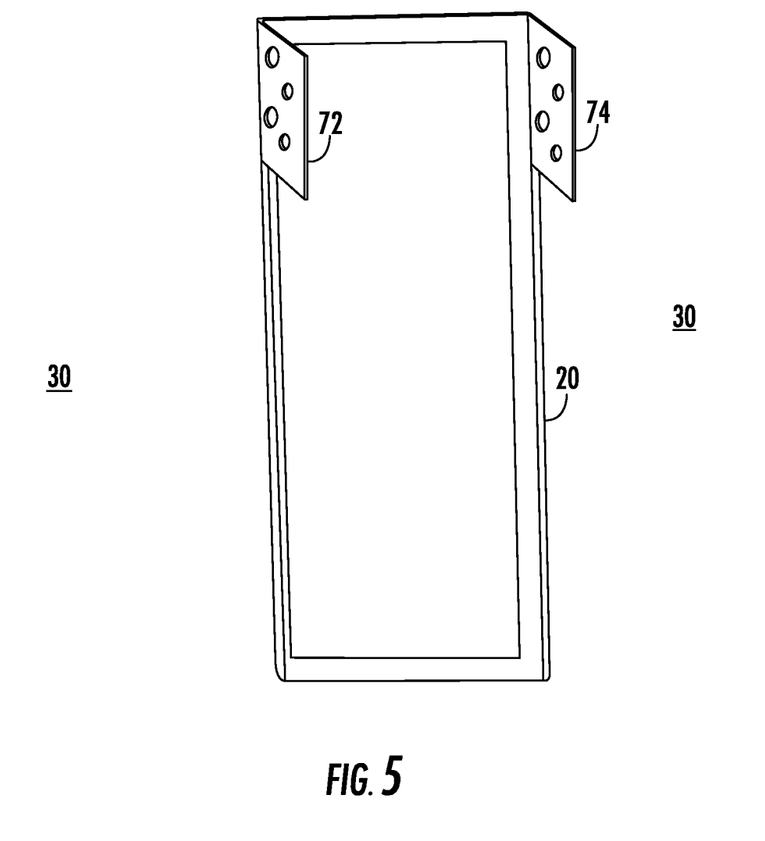
FIG. 5 is a side, perspective view of another exemplary embodiment of a protective apparatus for telecommunication lines with the protective skirt removed.

In the embodiment illustrated in FIG. 3, the transition platform 82 forms an integral part of the mounting frame 20. In other embodiments, the transition platform 38 may for a separate part that is either mounted directly to the external facade 30 of the building or mounted to the mounting frame 20. For example, in the embodiment illustrated in FIG. 5 the mounting frame 20 does not initially include a transition platform 38 and the transition platform 38 is attachable to the mounting frame 20 after the initial manufacturing process of the mounting frame 20.

Figure 9:
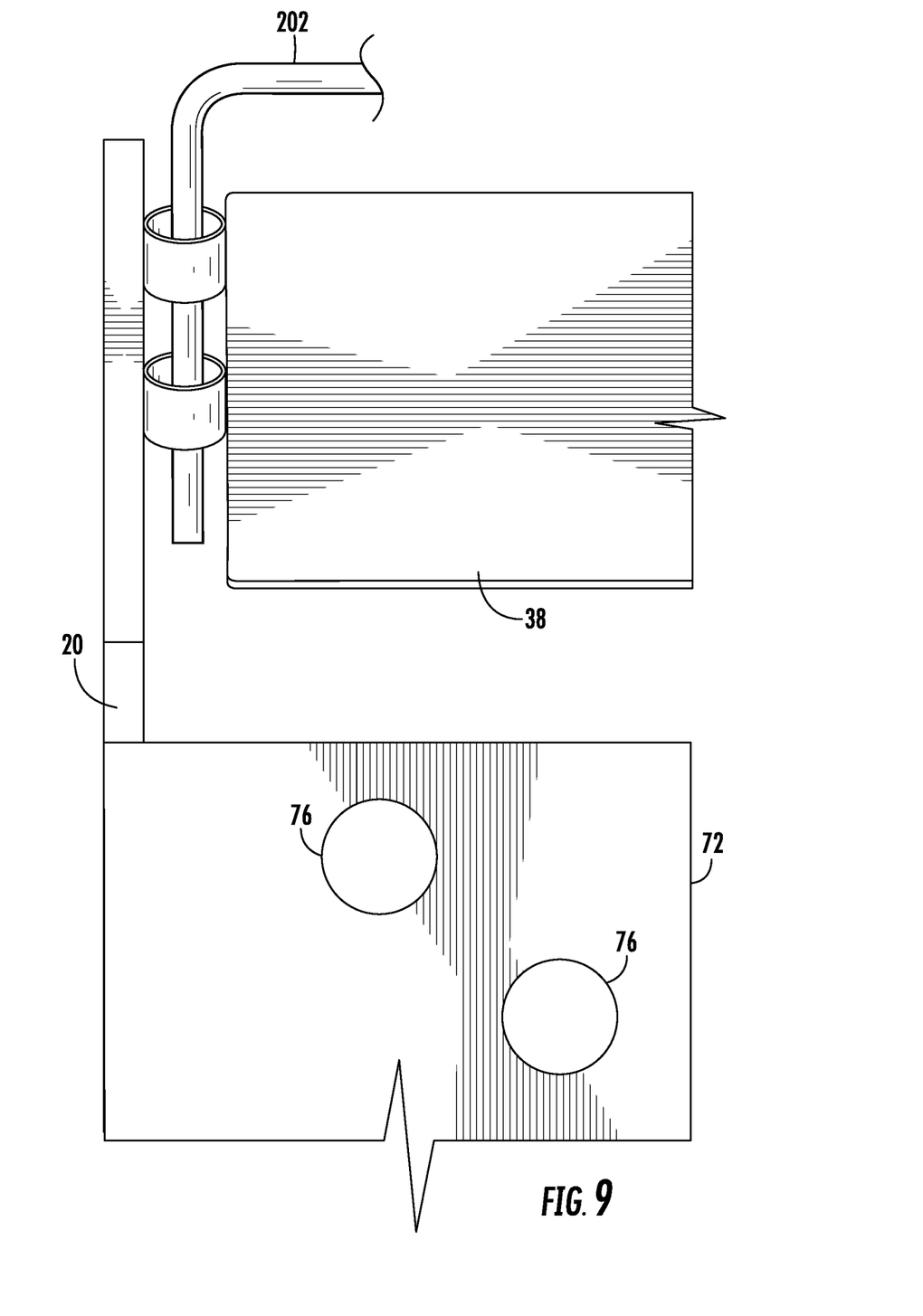
FIG. 9 is a schematic view of a removable hinge.

In some embodiments, the transition platform 82 is removably mountable to the mounting frame 20. Referring to FIG. 9, for example, the transition platform 82 may be mounted to the mounting frame 20 by way of one or more removable hinges 202 to allow for easy installation and removal of the transition platform 82. In some embodiments, the removable hinges 202 allow the transition platform 82 to hingedly rotate on the mounting frame 20, as described in more detail below.

Figure 6:
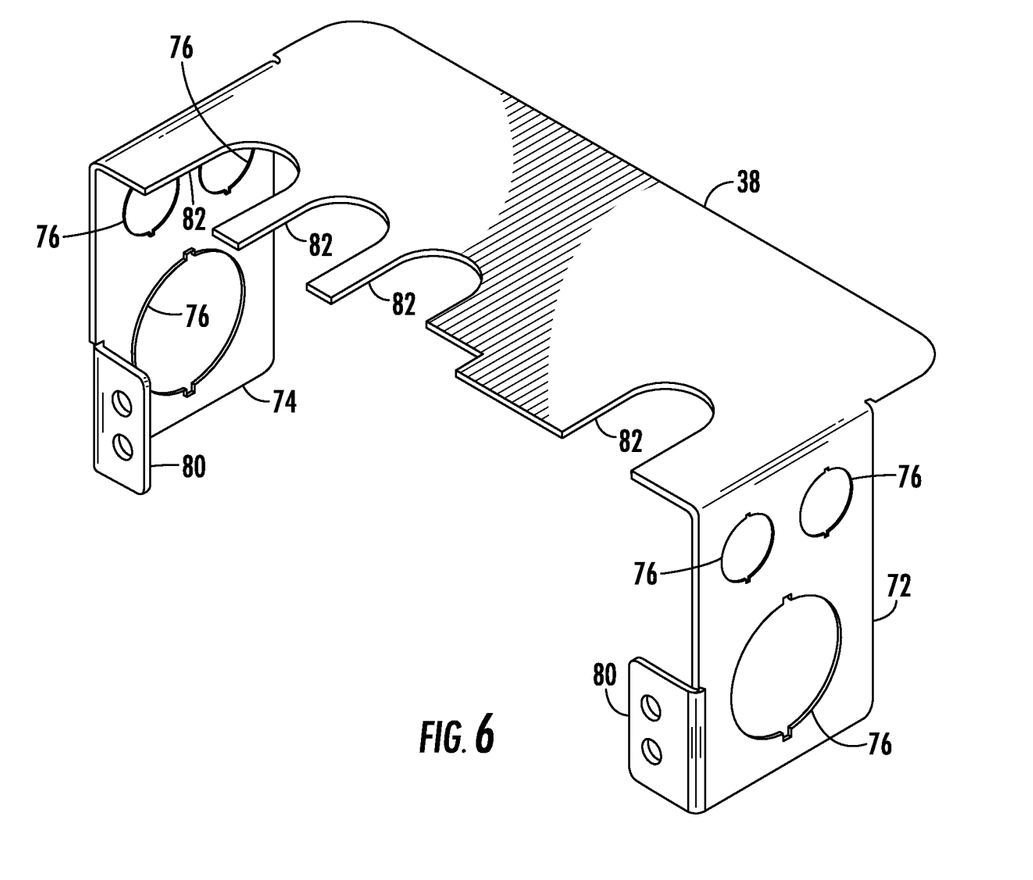
FIG. 6 is a rear, perspective view of an exemplary embodiment of a transition platform.

Referring now to FIG. 6, in another embodiment the transition platform 38 and the sidewalls 72, 74 form an integral piece that is separately attachable to the mounting frame 20. For example, the sidewalls 72, 74 may include attachment mechanisms 80 for coupling the sidewalls 74, 76 and the transition platform 38 to the mounting frame 20.

Figure 7:
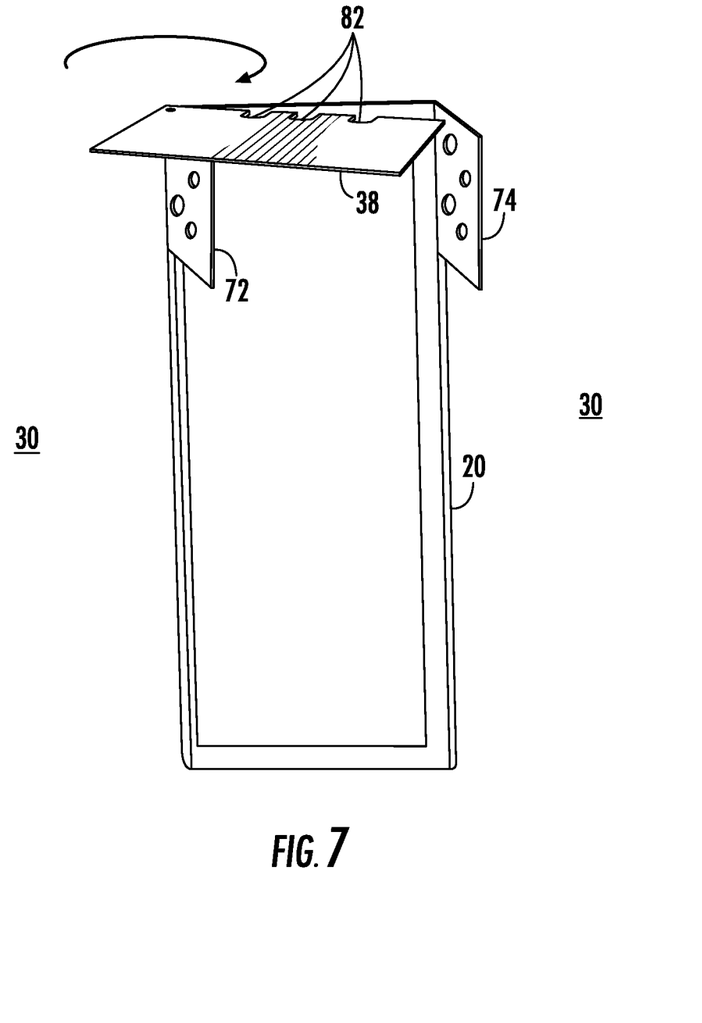
FIG. 7 is a side, perspective view of another exemplary embodiment of a protective apparatus for telecommunication lines with the protective skirt removed.

Referring now to FIG. 7, in some embodiments the transition platform 38 is pivotally coupled to the mounting frame 20. The transition platform 38 is rotatable between a closed position in which the telecommunication cables 12, 14 are trapped between the openings 82 and a building facade 30, and an open position (the open position is illustrated in FIG. 7) in which the transition platform 38 is pivoted away from the building facade 30 and the telecommunications cables 12, 14 can be easily removed from the openings 82. In this embodiment, the installation or removal of the telecommunications lines 12, 14 from the transition platform 38 is greatly facilitated due to the pivoting motion of the transition platform 38.

In some embodiments, the transition platform 38 is mounted to the mounting frame 20 by way of two or more pull-pin hinges, loose-pin hinges, lift-off hinge, quick-release or other type of removable hinge 202. An example removable hinge 202 is illustrated in FIG. 9. The removable hinge 202 allows for the transition platform 38 to be completely removed from the mounting frame 20 and also allows the transition platform 38 to be pivotaly mounted to the mounting frame 20 when only the removable hinges 202 on one side of the transition platform 38 are coupled. This also allows for locking the transition platform 38 in the closed position by engaging the removable hinges 202 on both sides of the transition platform 38. In some embodiments, the transition platform 38 includes an additional locking feature to hold the transition platform 38 in one or both of the open and closed positions. In other embodiments, the transition platform 38 is mounted to the mounting frame 20 by other hinge mechanisms, such as a fixed hinge.

Figure 8:
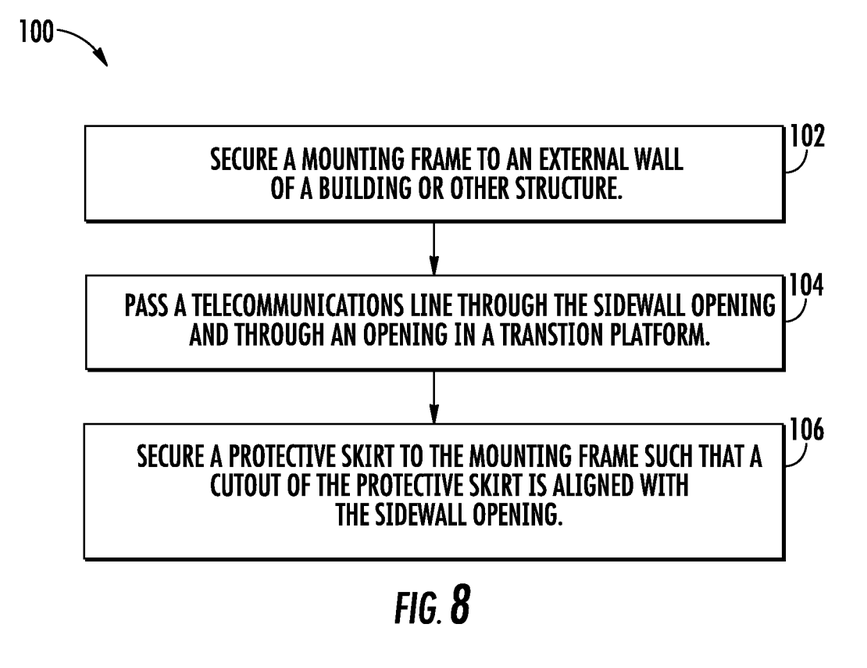
FIG. 8 is a schematic diagram showing a method protecting a telecommunications line.

FIG. 8 illustrates a method 100 of protecting telecommunications cables 12, 14 using a protective apparatus 10. The method 100 begins in a mounting frame 20 is secured to an external facade 30 or wall of a building, home or other structure, as illustrated at block 102. The mounting frame 20 includes at least one sidewall 72, 74 that extends away from the building facade 30 when the mounting frame 20 is attached to the building facade 30 to facilitate access by a craftsman. The sidewall 72, 74 includes a sidewall opening 76 to allow passage of a telecommunications line 12, 14, as discussed above.

A craftsman passes a telecommunications line 12, 14 through the sidewall opening 76 and through an opening 82 in a transition platform 38, as illustrated at block 104. The telecommunications line 12, 14 may then pass into a telecommunications terminal 18, which may be positioned directly adjacent to the protective apparatus 10.

A protective skirt 44 is then mounted to the mounting frame 20 such that a cutout 52, 54 of the protective skirt 44 is aligned with the sidewall opening 76, as illustrated at block 106. In some embodiments, the method 100 also includes removing the protective skirt 44 from the mounting frame 20 without adjusting the position of the sidewall 72, 74 or removing the telecommunications lines 12, 14 from the sidewall openings 76.

As discussed above, in certain embodiments the sidewall openings 76 include removable portions that break away when a force is applied thereto. Thus, in some embodiments the method also includes applying a force to the removable portions to allow passage of telecommunications lines 12, 14 through the sidewall openings 76.

It is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

What is claimed is:

1. A protective apparatus for telecommunication lines, comprising:
    a mounting frame, wherein the mounting frame comprises a sidewall having a sidewall opening;
    a transition platform coupled to the mounting frame, the transition platform comprising an opening; and
    a protective skirt, wherein the mounting frame, the transition platform and the protective skirt define an internal space when the protective skirt is removably coupled to the mounting frame, wherein the protective skirt comprises a cutout for allowing unobstructed access to the sidewall opening, wherein the opening of the transition platform comprises a non-enclosed shape having an open end, and wherein the open end is positional against an external wall when the mounting frame is secured to the external wall to facilitate trapping a telecommunications line between the opening and the external wall.

2. The protective apparatus of claim 1, wherein the cutout is aligned with the sidewall opening when the protective skirt is removably coupled to the mounting frame.

3. The protective apparatus of claim 1, wherein the sidewall opening is accessible from an exterior space through the cutout.

4. The protective apparatus of claim 1, wherein the cutout comprises a non-enclosed shape having an open end.

5. The protective apparatus of claim 1, wherein the protective skirt is removable from the mounting frame without adjusting the position of the side wall.

6. The protective apparatus of claim 1, wherein the sidewall opening comprises a removable portion, wherein the removable portion comprises a weakened peripheral edge configured to break away from the mounting frame when a force is applied to the removable portion.

7. The protective apparatus of claim 1, wherein the mounting frame comprises a mounting feature for securing the mounting frame to an external wall of a structure.

8. The protective apparatus of claim 7, wherein a peripheral edge of the side wall corresponds to an inner edge of the cutout, wherein the peripheral edge of the side wall is located adjacent to the inner edge of the cutout when the protective skirt is removably coupled to the mounting frame.

9. The protective apparatus of claim 1, wherein the transition platform is pivotally coupled to the mounting frame.

10. The protective apparatus of claim 9, wherein the transition platform is pivotable between an open position and a closed position, wherein the open end of the opening is positionable adjacent to an external wall of a building when the transition platform is in the closed position to trap a telecommunications line between the opening and the external wall of the building.

11. The protective apparatus of claim 1, wherein the mounting frame comprises a first side wall and a second side wall, wherein the first sidewall is positioned opposite from the second side wall on the mounting frame to allow passage of the telecommunication line from an exterior space outside of the mounting frame through either the first side wall or the second side wall.

12. A protective apparatus for telecommunication lines, comprising:
    a mounting frame, wherein the mounting frame comprises a sidewall having a sidewall opening to allow passage of a telecommunications line;
    a transition platform coupled to the mounting frame, the transition platform comprising an opening to allow passage of the telecommunication line; and
    a protective skirt, wherein the mounting frame, the transition platform and the protective skirt define an internal space when the protective skirt is removably coupled to the mounting frame, wherein the protective skirt comprises a cutout corresponding in shape to the sidewall and allowing unobstructed access to the sidewall opening, wherein the opening of the transition platform comprises a non-enclosed shape having an open end, wherein the transition platform is pivotally coupled to the mounting frame, such that the transition platform is pivotable between an open position and a closed position, wherein the open end of the opening is positionable adjacent to an external wall of a building when the transition platform is in the closed position to trap a telecommunications line between the opening and the external wall of the building.

* * * * *

UNITED STATES PATENT AND TRADEMARK OFFICE
CERTIFICATE OF CORRECTION

PATENT NO. : 10,559,947 B2
APPLICATION NO. : 15/593841
DATED : February 11, 2020
INVENTOR(S) : Ryan Everette Frye et al.

It is certified that error appears in the above-identified patent and that said Letters Patent is hereby corrected as shown below:

In the Claims

In Column 10, Line 11, Claim 1, delete "positional" and insert -- positionable --, therefor.

Signed and Sealed this
Fifth Day of May, 2020

Andrei Iancu
*Director of the United States Patent and Trademark Office*